United States Patent [19]

Ball

[11] Patent Number: 4,557,364

[45] Date of Patent: * Dec. 10, 1985

[54] BULK CONVEYOR APPARATUS

[75] Inventor: David C. Ball, La Puente, Calif.

[73] Assignee: The W. W. Sly Manufacturing Co., Cleveland, Ohio

[*] Notice: The portion of the term of this patent subsequent to Jan. 8, 2002 has been disclaimed.

[21] Appl. No.: 688,614

[22] Filed: Jan. 3, 1985

Related U.S. Application Data

[63] Continuation of Ser. No. 126,531, Mar. 3, 1980, Pat. No. 4,492,294.

[51] Int. Cl.$^4$ ............................................. B65G 11/00
[52] U.S. Cl. .................... 193/25 C; 414/291; 414/299
[58] Field of Search ............... 193/3, 30, 25 R, 25 C, 193/25 E, 25 S; 414/291, 299; 406/36; 141/93, 94, 96

[56] References Cited

U.S. PATENT DOCUMENTS

| 3,334,821 | 8/1967  | Garrison          | 141/96 X  |
| 3,428,098 | 2/1969  | Slay              | 406/36 X  |
| 4,061,221 | 12/1977 | Higashinaka et al.| 141/93 X  |
| 4,182,591 | 1/1980  | Stanelle          | 193/25 C  |
| 4,340,136 | 7/1982  | Hanrot et al.     | 141/93 X  |
| 4,492,294 | 1/1985  | Ball              | 193/25 C  |

Primary Examiner—Jeffrey V. Nase
Attorney, Agent, or Firm—Fay, Sharpe, Fagan, Minnich & McKee

[57] ABSTRACT

A bulk material conveyor comprises an elongated flexible conveying duct and apparatus for viewing the materials being transferred within the duct. The apparatus maintains a fluid stream proximate to the apparatus for viewing. The apparatus for maintaining a fluid stream in one form includes first, second and third truncated conical members which are disposed in generally coaxial relationship. At least part of each truncated conical member overlaps at least one other truncated conical member.

13 Claims, 5 Drawing Figures 4,557,364

BULK CONVEYOR APPARATUS

CROSS-REFERENCE TO RELATED APPLICATION

This is a continuation of co-pending application U.S. Ser. No. 126,531, filed on Mar. 3, 1980, now U.S. Pat. No. 4,492,294, issued on Jan. 8, 1985.

BACKGROUND OF THE INVENTION

The invention relates to material handling apparatus and particularly to apparatus for handling bulk fluent materials. Such materials include liquids and particulate materials including grains, powdered chemicals, polyvinylchloride resin, coal, coke, and sulfur.

Such materials are commonly sold in bulk. Materials are commonly moved from one location to another such as from a storage reservoir to a railroad car by means of flexible conduits. A major difficulty in the use of such flexible conduits is that it is not possible to clearly view the bulk material which is being transferred in the immediate area of the outlet or spout at the end of the bulk conveyor. The problem becomes most acute where the material being transferred has a low density and particles tend to float in the air stream or where a liquid is being transferred which produces vapors which are opaque. The inability to view the material being discharged from the flexible conduit often results in the discharge of dust, vapor or other particles into the air surrounding the area due to overfilling. The discharge of such materials may be highly undesirable for one or more reasons. The discharge of the material such as dust may present an explosion hazard. The importance of this problem is evidenced by the numerous deaths just from grain dust explosions. The material discharged may also have serious adverse health and/or ecological consequences. The undesirable discharge of dust and particles into the area, into the atmosphere and onto the equipment in adjacent areas as well as the spillage of liquid materials due to overflowing or spraying is also undesirable because of the expense and time consuming clean up which may be required. For example, with such liquid materials as molasses clean up time may be very substantial.

It is a primary object of the invention to provide apparatus for bulk handling of materials which will enable the operator to observe the material being handled.

Another object of the invention is to provide apparatus which will permit an operator to visually observe the level of an accumulated quantity of material which is being delivered through a flexible conduit.

SUMMARY OF THE INVENTION

The foregoing objects and other objects and advantages which shall become apparent from the detailed description of the preferred embodiment are attained in a bulk material conveyor which comprises means for conveying which includes an elongated flexible duct and means for viewing the materials being transferred within the means for conveying, and means for maintaining a fluid stream proximate to the means for viewing. The viewing means is adjacent to the outlet end portion of the flexible duct to provide means for an operator to observe material being delivered from the duct.

The apparatus for maintaining a fluid stream in one form of the invention comprises three truncated conical members. The first truncated conical member has an outside diameter which varies from a first outside diameter to a second outside diameter which is greater than the first outside diameter. A second truncated conical member has an inside diameter, at least one axial cross section, which is greater than the first outside diameter of the first truncated conical member. The second truncated conical member is disposed in substantially coaxial relationship to the first truncated conical member with at least an axial portion thereof overlapping a portion of the first truncated conical member. The third truncated conical member has an inside diameter, at least at one axial cross section, which is greater than the first outside diameter. The third truncated conical member is disposed at least partly in axially overlapping relationship with the second truncated conical member.

The means for viewing in the apparatus may comprise a transparent member extending between the second truncated conical member and the third truncated conical member.

The means for maintaining a fluid stream in one form of the invention cooperates with the first, second and third truncated conical members to draw a fluid intermediate the first truncated conical member and both the second and third truncated conical members.

The transparent member in the apparatus may be arcuate.

The first truncated conical member has an outside diameter at one cross section which is dimensioned to provide an annular opening intermediate the first and third truncated conical members. The apparatus may include means for maintaining a fluid stream including means for moving a fluid through the annular opening at a velocity sufficient to capture visual obstructions to the means for viewing. A pressure differential is maintained between a region intermediate to the second and third truncated conical members and the annular opening.

BRIEF DESCRIPTION OF THE ACCOMPANYING DRAWING

BRIEF DESCRIPTION OF THE PREFERRED EMBODIMENT

Figure 1:
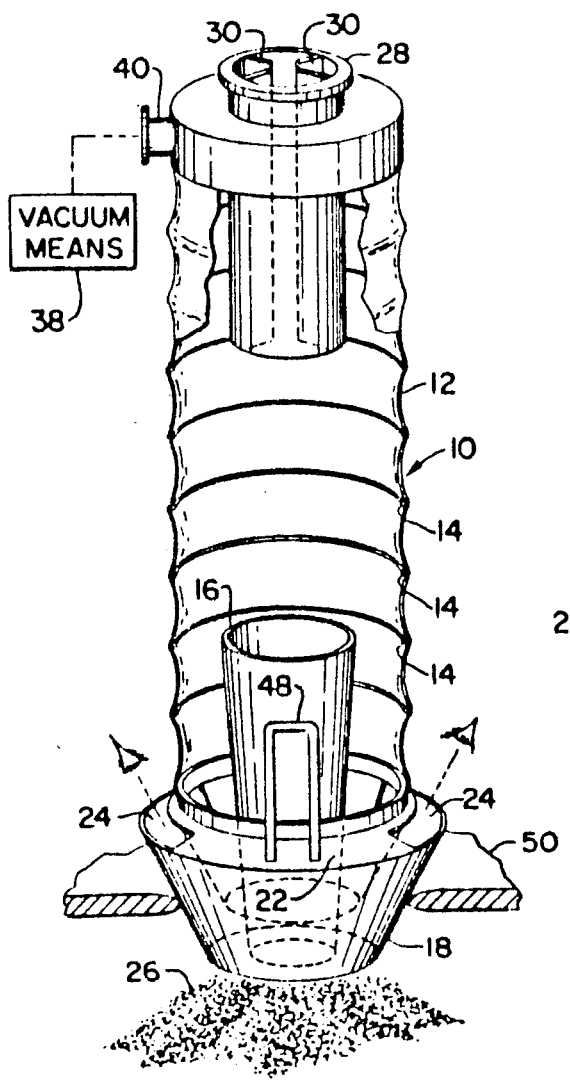
FIG. 1 is a perspective view of a delivery chute for a bulk conveyor with a portion of the chute side wall broken away for ease of illustration.
Figure 2:
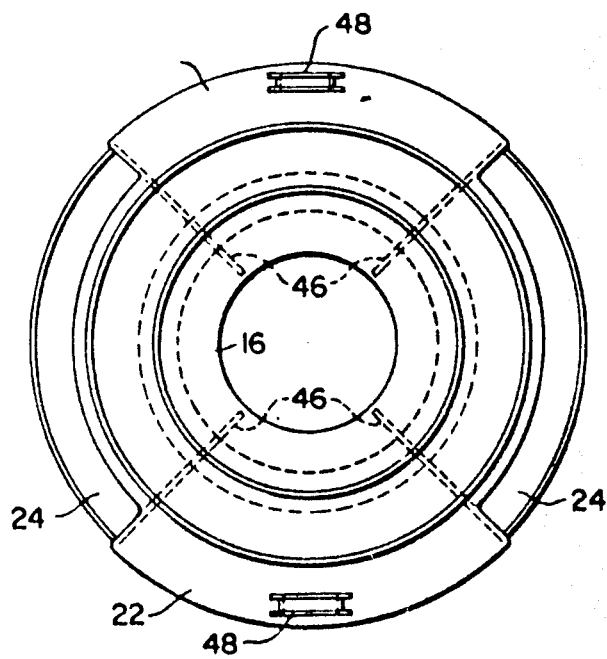
FIG. 2 is a top view of the loading spout at the lower axial extremity of the delivery chute of FIG. 1.
Figure 3:
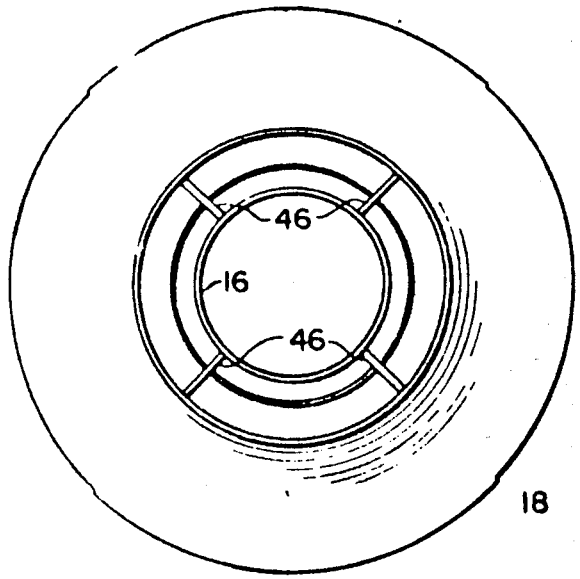
FIG. 3 is a bottom view of the loading spout shown in FIG. 2.
Figure 4:
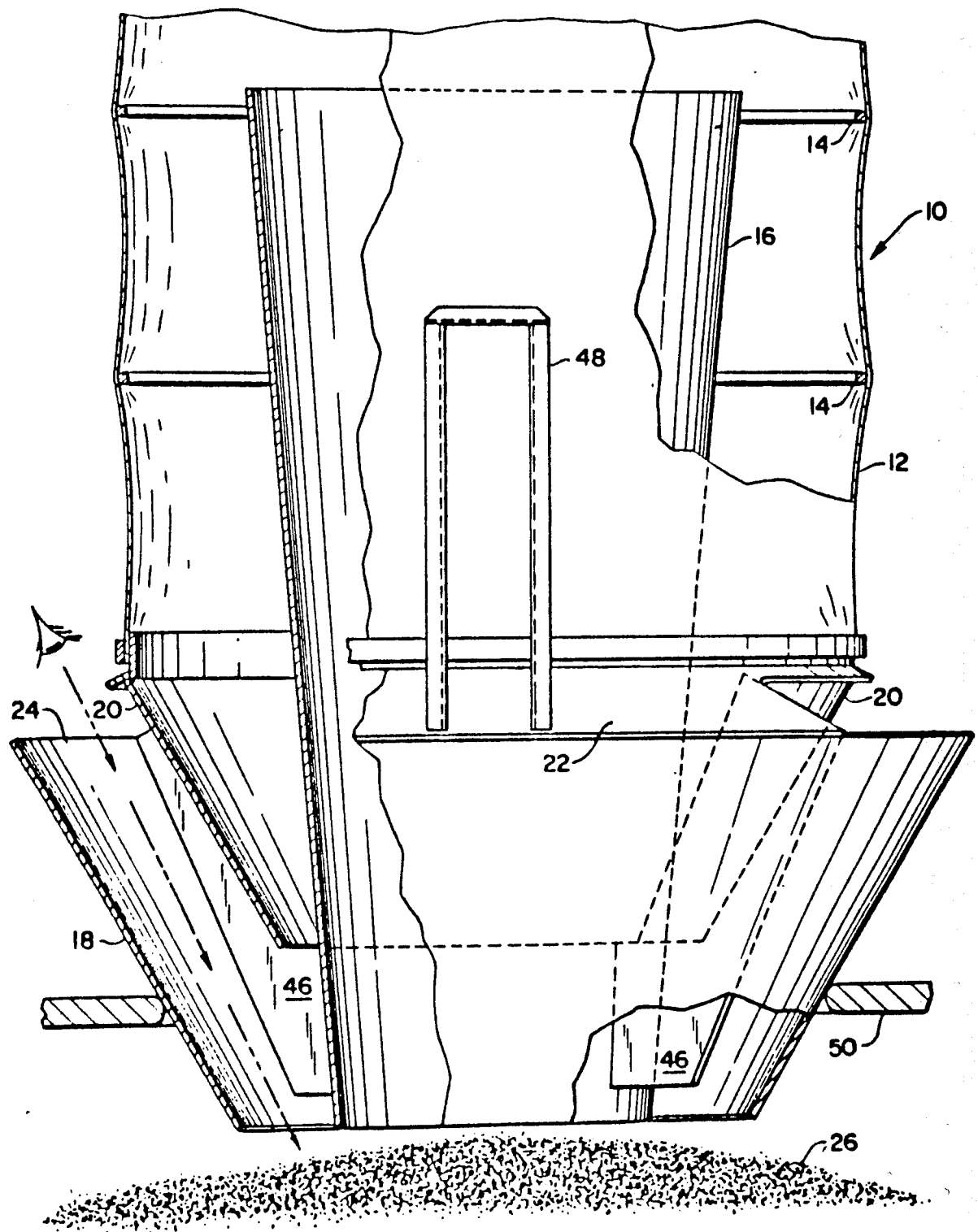
FIG. 4 is a partially broken away sectional view of the lower end of the delivery chute and the loading spout; and, FIG. 5 is a sectional, partially schematic view of the apparatus shown in FIGS. 1-4.
Figure 5:
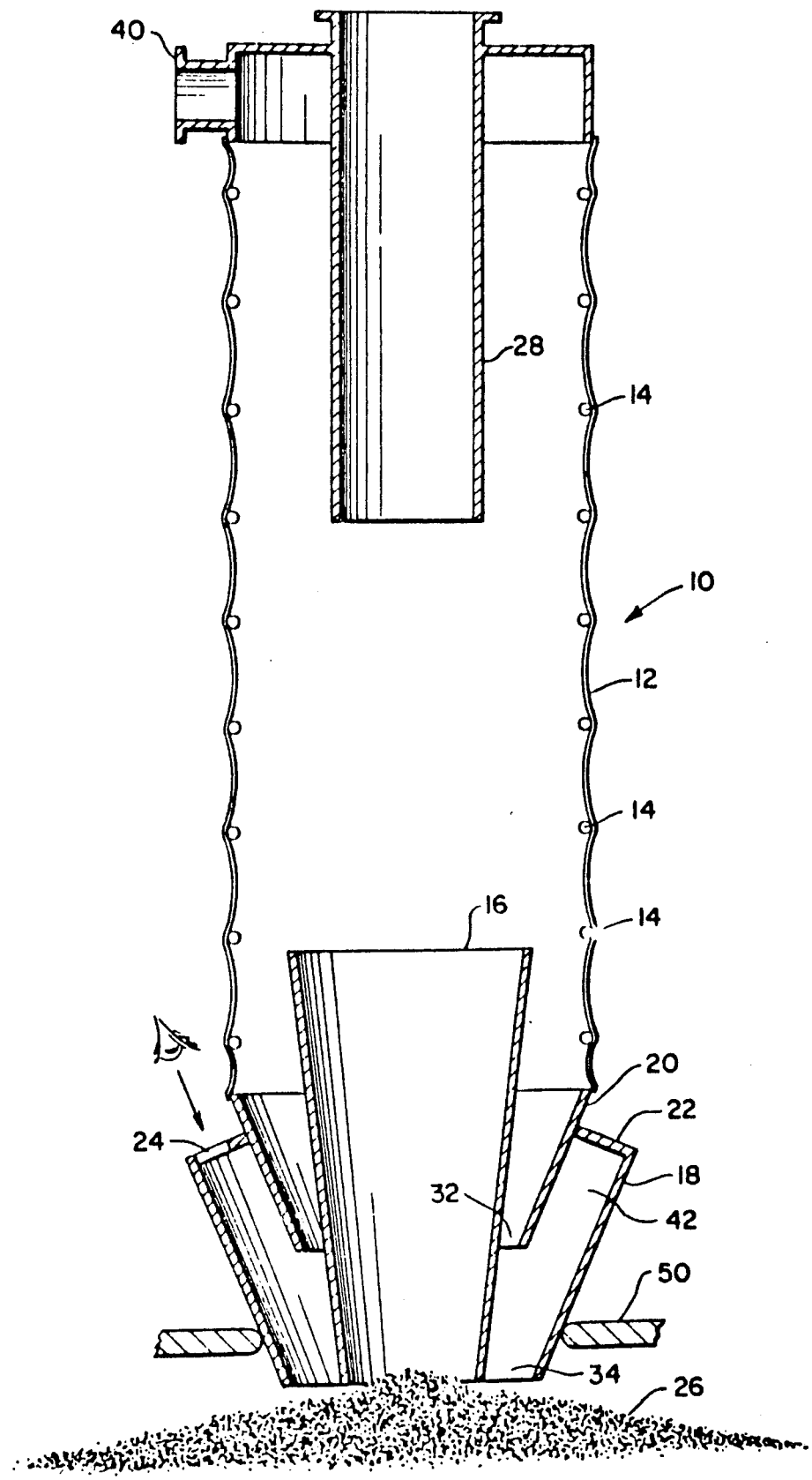

Referring now to the drawings, there is shown a bulk material conveyor 10 which includes a flexible conduit 12 having an upper inlet end portion, and lower outlet end portion, and ribs 14 disposed at axially spaced intervals. A first truncated conical member or tapering sleeve 16 is disposed at the lower axial extremity of the conveyor 10.

A second truncated conical member 18 is disposed in generally coaxial overlapping relationship. A third truncated conical member 20 is also disposed in coaxial overlapping relationship with both the first and the second truncated conical members. An annular member 22 extends intermediate the axial extremity of the second truncated conical member 18 which is largest and the outer surface of the third truncated conical member 20. The annular member 22 ordinarily will include a transparent portion 24 through which an operator may view the level of fluent material 26 which is being deposited by the conveyor 10. By enabling the operator to view the material 26 he will be able to operate controls (not shown) in order to interrupt the flow of the material 26 into the conveyor 10.

The inlet 28 is provided with baffles 30,30 which are intended to direct the flow of fluent material 26 downward into the first truncated conical member 16. The dimensioning of the first, second and third truncated conical members 16, 18, 20 is such that an annular opening 32 is defined intermediate the first and third truncated conical members 16, 20 and a larger annular opening 34 is defined intermediate the smallest axial extremities respectively of the first and second truncated conical members 16, 18. Ordinarily the second truncated conical member 18 will extend axially so as to be flush with the axial extremity of the small end of the first truncated conical member 16. The annular opening 34, of course, is the opening through which the viewer observes by means of transparent member 24 the level of the material 26.

A vacuum means 38 is connected to a port 40 at the upper axial extremity of the conveyor 10. The vacuum means 38 may be a squirrel cage blower or equivalent apparatus capable of moving a large fluid volume. In operation a vacuum applied to the interior of the conveyor 10 results in air and other vapors and dust being drawn out of the region 42 intermediate the second and third conical members 18, 20 through the annular opening 32 is important in that it must be small enough to result in a fluid velocity through it that will capture ambient dust and/or vapor which would tend to obstruct the viewing surface 24 of the member 22. It must be large enough, on the other hand, to allow a sufficient volume of air to be drawn by the vacuum means 38 in order to clear the region 42. Stated another way, the pressure at the region 42 must be higher than the pressure at the annular opening 32.

The structure also includes radially extending supports 46, 46, 46, 46 intermediate the first and third truncated conical members 16, 20. Handles 48 are provided on the surface 22 to assist in maneuvering the conveyor 10. The outer surface of the second truncated conical member 18 cooperates in operation with a hole in a member 50 which may be a part of, for example, a railroad car.

Other alternate structural supports may be provided intermediate the truncated conical members 16, 18, and 20 without departing from the spirit of the invention. In other forms of the invention cylindrical members may be used in place of the truncated conical members which have been described.

The invention has been described with reference to its illustrated preferred embodiment. Persons skilled in the art of constructing bulk conveyor apparatus may, upon exposure to the teachings herein, conceive variations in the mechanical development of the components therein. Such variations are deemed to be encompassed by the disclosure, the invention being delimited only by the appended claims.

The inventor claims:

1. A bulk conveyor, comprising:

duct means having an elongated structure for conveying an associated bulk material therealong in a first direction for exit at an outlet end thereof;

means for confining a fluid stream flowing in a second direction generally opposite to said first direction at least adjacent said outlet end, said fluid stream adapted to continuously remove dust and like particles from the area of said outlet end as an associated bulk material exits therefrom; and, means attached to move with said duct means for visually monitoring bulk material exiting said outlet end, said monitoring means including a viewing passage having a first end disposed adjacent said outlet end in radial outward spaced relation thereto from both said outlet end and said confining means, whereby said confining means continuously removes dust and like particles generated by an associated bulk material exiting said outlet end in order that said viewing passage will be generally clearer for accommodating visual monitoring of the bulk material externally of said outlet end.

2. The conveyor as defined in claim 1 wherein said maintaining means operatively communicates with said duct means at an area thereof spaced from said outlet end for causing said fluid stream to flow in said second direction in a generally surrounding relationship with an associated bulk material conveyed through said duct means in said first direction.

3. The conveyor as defined in claim 2 wherein said confining means comprises vacuum means for drawing ambient air into and through at least a portion of said duct means from adjacent said outlet end.

4. The conveyor as defined in claim 1 wherein said outlet end is defined by an elongated nozzle-like member and said viewing means is defined by a first sleeve member disposed in radially spaced surrounding relation with at least an axial portion of said nozzle-like member, said viewing passage extending generally axially of said first sleeve member.

5. The conveyor as defined in claim 4 wherein said duct means has a side wall interposed radially of said nozzle-like member and said first sleeve member, said duct means accommodating the flow of said fluid stream.

6. The conveyor as defined in claim 4 wherein said nozzle-like member, said first sleeve member, and said duct means each has an outer terminal end, the outer terminal end of said duct means being spaced axially inward from the outer terminal ends of said nozzle-like member and said first sleeve member.

7. The conveyor as defined in claim 4 wherein said first sleeve member has an inner end axially spaced from said duct means outlet end and a top wall extending generally radially between said inner end and said duct means, said top wall including at least one opening therein defining a viewing opening communicating with said viewing passage.

8. The conveyor as defined in claim 1 wherein the outer terminal end of said duct means is defined by a second sleeve member adapted to accommodate the flow of said fluid stream into said duct means in said second direction in a generally surrounding relationship with an associated bulk material conveyed through said duct means in said first direction.

9. A method for accommodating visual monitoring of bulk material deposition from an enclosed bulk material conveyor, said method comprising the steps of:

(a) moving the bulk material along the conveyor in a first direction toward and outwardly from a conveyor outlet end;

(b) causing a fluid stream to flow through means for confining said fluid stream, in a second direction opposite to said first direction in closely spaced relation to the bulk material at least adjacent said conveyor outlet end for removing dust and like particles emanating from the bulk material as it passes outwardly from said outlet end; and (c) providing means attached to move with said conveyor for forming a viewing channel in radially outwardly spaced relation from both said outlet end and said confining means, said viewing channel communicating externally adjacent said conveyor outlet end to permit visual monitoring of bulk material passing outwardly from said outlet end;

whereby said confining means removes dust and like particles generated by the bulk material exiting said outlet end in order that said viewing passage will be generally cleared for accommodating visual monitoring of the bulk material externally of said outlet end.

10. The method as defined in claim 9 wherein said step of moving comprises passing the bulk material axially along an enclosed duct in radial spaced relation to the interior of said duct, and said step of causing comprises having said fluid stream flow through at least an axial portion of said duct in surrounding relation with the bulk material.

11. The method as defined in claim 10 further including the step of placing said fluid stream in fluid communication with said viewing channel adjacent said outlet end for continuously removing dust and like particles from said viewing channel to enhance visual monitoring of said outlet end.

12. The method as defined in claim 9 wherein said step of moving comprises passing the bulk material axially along the central portion of an enclosed duct having a first cross-sectional dimension, said method further including the step of locating an elongated nozzle-like member having a second cross-sectional dimension less than said first dimension coaxial with said duct for defining an annular passage into said duct adjacent said outlet end, and wherein said step of causing comprises having said fluid stream enter said duct at said annular passage for traveling in said second direction in close surrounding relation with the flow of bulk material.

13. The method as defined in claim 12 wherein said step of providing comprises locating a sleeve-like member coaxial with said nozzle-like member and dimensioning said sleeve-like member to have a third cross-sectional dimension greater than said first cross-sectional dimension, said viewing channel extending from adjacent said outlet end to a position spaced axially along said sleeve-like member from said outlet end.

* * * * *